(12) United States Patent
Spitler (10) Patent No.: US 8,770,329 B2
(45) Date of Patent: Jul. 8, 2014

(54) ENGINE COOLING SYSTEM (75) Inventor: Jason Spitler, LaGrange, GA (US)

(73) Assignee: Caterpillar Forest Products Inc., Peoria, IL (US)

( * ) Notice: Subject to any disclaimer, the term of this patent is extended or adjusted under 35 U.S.C. 154(b) by 331 days.

(21) Appl. No.: 13/184,899

(22) Filed: Jul. 18, 2011

(65) Prior Publication Data

US 2013/0022432 A1    Jan. 24, 2013

(51) Int. Cl.
*B60K 11/04* (2006.01)
(52) U.S. Cl.
USPC ......................................... 180/68.4; 180/68.1
(58) Field of Classification Search
USPC .............................. 180/68.4, 68.1
See application file for complete search history.

(56) References Cited

U.S. PATENT DOCUMENTS

| | | | |
|---|---|---|---|
| 1,366,228 A | 1/1921 | White | |
| 2,216,670 A | 10/1940 | Klavik | |
| 4,117,902 A * | 10/1978 | Henline et al. | 180/54.1 |
| 4,287,961 A * | 9/1981 | Steiger | 180/68.4 |
| 4,696,361 A * | 9/1987 | Clark et al. | 180/68.4 |
| 4,757,858 A * | 7/1988 | Miller et al. | 165/41 |
| 4,815,550 A * | 3/1989 | Mather et al. | 180/68.1 |
| 5,042,602 A * | 8/1991 | Nakatani et al. | 180/68.1 |
| 5,590,624 A | 1/1997 | Emond et al. | |
| 6,092,616 A * | 7/2000 | Burris et al. | 180/68.1 |
| 6,129,056 A * | 10/2000 | Skeel et al. | 123/41.49 |
| 6,223,807 B1 * | 5/2001 | Asche et al. | 165/43 |
| 6,257,359 B1 * | 7/2001 | Granlund et al. | 180/68.1 |
| 6,435,264 B1 * | 8/2002 | Konno et al. | 165/41 |
| 6,543,523 B2 | 4/2003 | Hasumi | |
| 6,634,448 B2 * | 10/2003 | Bland | 180/68.1 |
| 6,871,697 B2 * | 3/2005 | Albright et al. | 165/51 |
| 7,255,189 B2 * | 8/2007 | Kurtz et al. | 180/68.4 |
| 7,398,847 B2 * | 7/2008 | Schmitt | 180/68.4 |
| 7,401,672 B2 * | 7/2008 | Kurtz et al. | 180/68.4 |
| 7,426,909 B2 * | 9/2008 | Keane et al. | 123/41.29 |
| 8,104,559 B2 * | 1/2012 | Kisse | 180/68.1 |
| 8,162,087 B2 * | 4/2012 | Kobayashi et al. | 180/68.6 |
| 8,167,067 B2 * | 5/2012 | Peterson et al. | 180/68.2 |
| 8,256,551 B2 * | 9/2012 | Entriken et al. | 180/68.1 |
| 8,342,277 B2 * | 1/2013 | Kotani et al. | 180/68.4 |
| 2004/0007346 A1 * | 1/2004 | Branham et al. | 165/41 |
| 2007/0144803 A1 | 6/2007 | Schneider | |
| 2009/0095441 A1 * | 4/2009 | Masunoya et al. | 165/41 |
| 2010/0071870 A1 * | 3/2010 | Kisse | 165/51 |
| 2010/0071978 A1 * | 3/2010 | Kisse | 180/68.2 |
| 2011/0011665 A1 * | 1/2011 | Peterson et al. | 180/309 |
| 2011/0155081 A1 * | 6/2011 | Entriken et al. | 123/41.49 |
| 2012/0325569 A1 * | 12/2012 | Takeda et al. | 180/68.1 |
| 2013/0000999 A1 * | 1/2013 | Naito et al. | 180/68.1 |

* cited by examiner

*Primary Examiner* — Jeffrey J Restifo
(74) *Attorney, Agent, or Firm* — Bart A. Fisher (57) ABSTRACT

An engine cooling system includes a first heat exchanger receiving a first fluid and a second heat exchanger receiving a second fluid. The second heat exchanger is located adjacent the first heat exchanger, thereby creating a stacked heat exchanger. The engine cooling system also includes a third heat exchanger receiving a third fluid. The third heat exchanger is located apart from the stacked heat exchanger. A venturi is located between the stacked heat exchanger and the third heat exchanger. An air mover is mounted to the venturi and located within the venturi. The air mover is configured to move air through the stacked heat exchanger and through the third heat exchanger. In a specific embodiment, the engine cooling system is incorporated into a vehicle, such as a skidder vehicle.

20 Claims, 7 Drawing Sheets

ENGINE COOLING SYSTEM

TECHNICAL FIELD

The present disclosure relates generally to an engine cooling system. In a specific embodiment, the present disclosure relates to a skidder machine having an engine cooling system with an enclosed fan.

BACKGROUND

Many types of machines and vehicles use an engine for motive power, and rely upon a radiator and an air circulation fan to assist in cooling the engine. The engine, radiator and fan are typically positioned within a housing that includes an air intake screen and an outlet opening. During normal operations, the fan draws air into the housing through the air intake screen, directs the air through the radiator and out of the housing through the outlet opening.

Legislation mandating a reduction in engine noise, engine emissions, and a variety of other engine byproducts has forced manufacturers of machines and vehicles to develop a host of equipment, such as noise suppressors and clean emission modules, to interface with the engine to comply with the respective legislation. Such equipment is generally situated in an engine compartment of the machine and takes up a large amount of space in that compartment or requires a larger engine compartment. However, increasing the size of the engine compartment generally reduces visibility for an operator using the machine. Thus, it is generally desirable to have a smaller engine compartment, thereby allowing the user of the machine to have better operational visibility.

U.S. Pat. No. 3,203,499 (the '499 patent) addresses the issue of a lack of sufficient space in the engine compartment by disclosing a cooling arrangement for supercharged engines. The '499 patent provides a vehicle having a cooling arranged on the front end of the vehicle. The cooling arrangement provides a cooling means in the form of a radiator and an intercooler mounted in substantially parallel relationship on the sides of the vehicle. Ambient air may be drawn through the cores of the intercooler and out through those of the radiator by means of a fan arrangement situated between the intercooler and the radiator. Unfortunately, the '499 patent does not teach what to do if more than two features (e.g., 1-the supercharger intercooler and 2-the engine radiator) of the vehicle need cooling.

Accordingly, the present disclosure provides an engine cooling system configured to address one or more of the problems discussed above.

SUMMARY OF THE INVENTION

In one aspect, the present disclosure provides an engine cooling system. The engine cooling system includes a first heat exchanger receiving a first fluid and a second heat exchanger receiving a second fluid. The second heat exchanger is located adjacent the first heat exchanger, thereby creating a stacked heat exchanger. The engine cooling system also includes a third heat exchanger receiving a third fluid. The third heat exchanger is located apart from the stacked heat exchanger. A venturi is located between the stacked heat exchanger and the third heat exchanger. An air mover is mounted to the venturi and located within the venturi. The air mover is configured to move air through the stacked heat exchanger and through the third heat exchanger. In a specific embodiment, the engine cooling system is incorporated into a vehicle, such as a skidder vehicle.

In another aspect, the present disclosure provides a vehicle. The vehicle includes a frame, an engine supported by the frame, and a drive train. The drive train is configured to propel the machine using power from the engine. An engine cooling system is in fluid communication with the engine. The engine cooling system includes a low $\Delta T$ heat exchanger and a high $\Delta T$ heat exchanger. The high $\Delta T$ heat exchanger is located apart from the low $\Delta T$ heat exchanger. A venturi is located between the low $\Delta T$ heat exchanger and the high $\Delta T$ heat exchanger. The venturi is nested with a drive shaft portion of the drive train. An air mover is located within the venturi. The air mover is configured to move air through the low $\Delta T$ heat exchanger and then through the high $\Delta T$ heat exchanger at a direction substantially normal to the drive shaft.

In yet another aspect, the present disclosure provides a skidder machine. The skidder machine includes a frame, an engine supported by the frame, and a drive train configured to propel the machine using power from the engine. The skidder machine further includes a grapple system mounted to the frame. The grapple system is configured to clinch objects, such as downed trees, using power from the engine and to tow the objects as the skidder machine is propelled. The skidder machine further includes an engine cooling system in fluid communication with the engine. The engine cooling system includes a first heat exchanger receiving a first fluid, and a second heat exchanger receiving a second fluid and located adjacent the first heat exchanger, thereby creating a stacked heat exchanger. The engine cooling system further includes a third heat exchanger receiving a third fluid and is located apart from the stacked heat exchanger. A venturi is located between the stacked heat exchanger and the third heat exchanger. An air mover is mounted to the venturi and is located within the venturi. The air mover is configured to move air through the stacked heat exchanger and through the third heat exchanger.

DETAILED DESCRIPTION

The present disclosure relates generally to an engine cooling system. In a specific embodiment, the present disclosure relates to a skidder machine having an engine cooling system with an enclosed fan.

Figure 1:
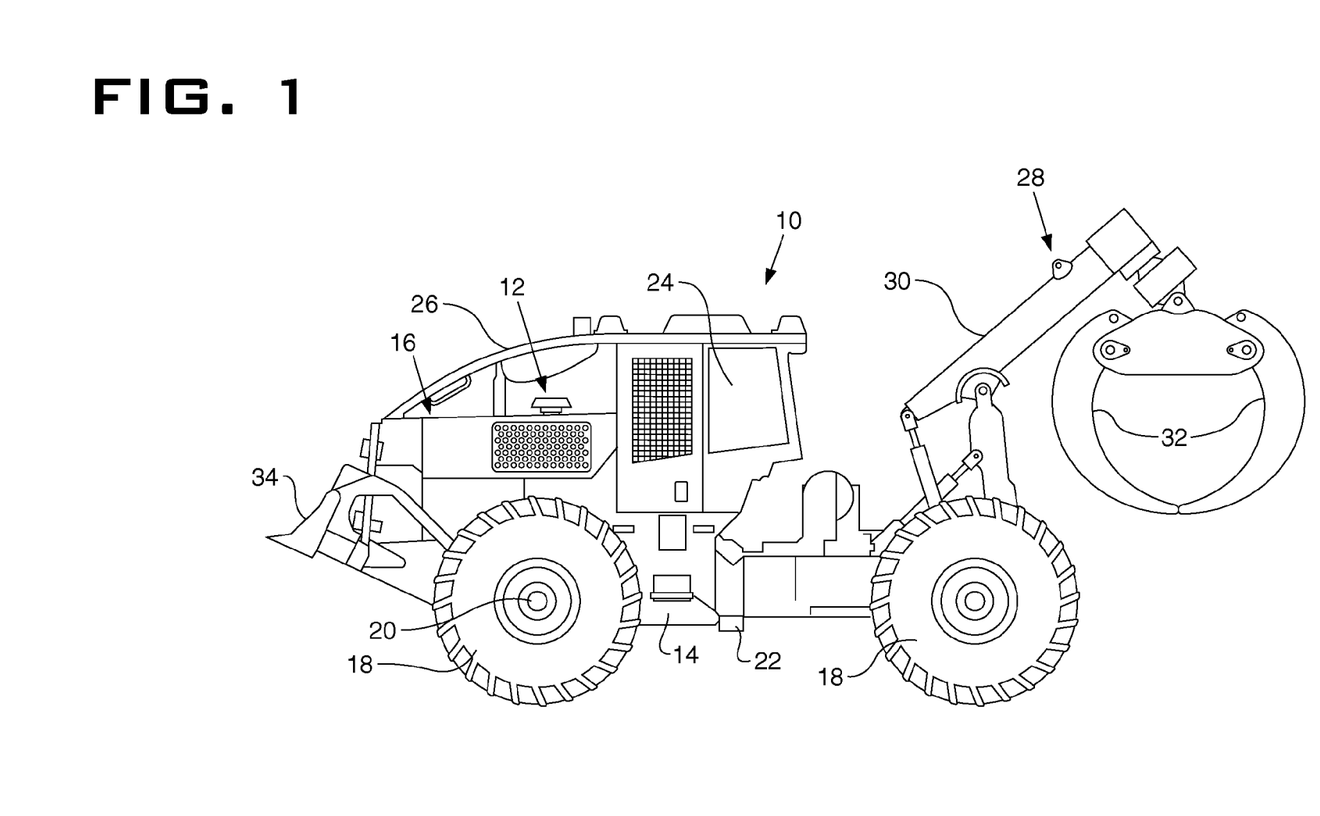
FIG. 1 illustrates a side view of an embodiment of a skidder machine including an engine cooling system according to the present disclosure.
Figure 2:
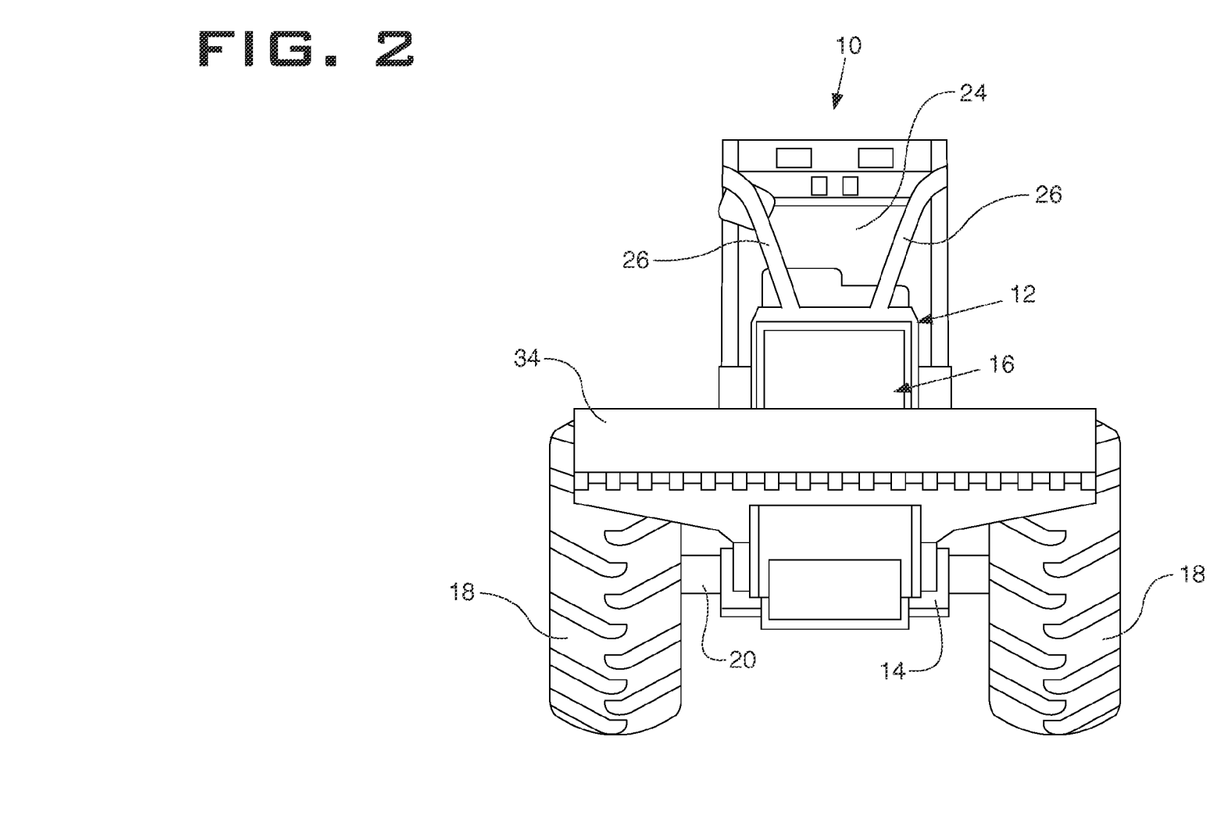
FIG. 2 illustrates a front view of the skidder machine of FIG. 1.

FIG. 1 illustrates a side view of an embodiment of a skidder machine 10 including an engine cooling system 12 according to the present disclosure. FIG. 2 illustrates a front view of the skidder machine of FIG. 1. While the main embodiments of the present disclosure are described generally for a skidder machine 10, it should be understood that the engine cooling system 12 disclosed herein can be used with engines for other machines (e.g., wheel loaders, track-type tractors, & etc.), vehicles (e.g., cars, trucks, & etc.), industrial engines (e.g., power generating systems, pumping systems, & etc.), locomotives, and anywhere else engine cooling systems are used.

The skidder machine 10 has a frame 14 supporting an engine 16. The engine 16 is a reciprocating diesel engine.

However, other types of engines such as gasoline, natural gas, or propane reciprocating engines, turbine engines, or rotary engines may be used with the engine cooling system 12 of the present disclosure. The engine 16 is cooled using the engine cooling system 12. The engine 16 propels the skidder machine 12 using a drive train (e.g., a transmission, an engine drive shaft, a transmission drive shaft, a differential gear box, and etc.). The drive train passes energy to one or more wheels 18 through an axle assembly 20, which, in turn, propels the skidder machine 12.

In an alternative embodiment, the engine 16 may provide power to one or more wheels 18 via a hydraulic pump (not shown), a pressurized fluid (not shown), and one or more fluid operated hydraulic motors (not shown). In yet another alternative embodiment, the engine 16 may provide power to one or more wheels 18 by driving an electric generator (not shown), which drives one or more electric motors (not shown), wherein the electric motor(s) drive the wheels 18.

The frame 14 is an articulating frame and pivots at a pivot point 22, enabling the skidder machine 12 to turn. An operator generally controls operations of the skidder machine 12 from an operator station 24. Because the skidder machine 10 is likely to be used during forestry operations, the skidder machine 10 may have one or more guards 26 to protect the operator station 24 from falling trees and debris.

Coupled to the frame 14 is a grapple system 28. The grapple system 28 includes a lift boom 30 and a plurality of hydraulically actuated arms 32 pivotably mounted to the lift boom 30. The arms 32 may be actuated to open and close to clench or grasp items such as fallen trees/logs. The grapple system 28 may be coupled to a winch system for locating the lift arms 32 with respect to the lift boom 30. The lift boom 30 may then be operated to raise the grapple system 28 to ease transportation of the clinched items. In an alternative embodiment, the skidder machine 10 may be configured with a cable winch system (not shown) for clinching items for transport.

In an embodiment, the skidder machine 10 also has a decking blade 34. The decking blade 34 pivots with respect to the frame 14 to be raised and lowered. In a lowered position, the decking blade 34 may be used to push out stumps and/or otherwise clear a ground surface as the skidder machine travels in a forward direction (e.g., moving in a direction from the grapple system 28 toward the decking blade 34.

Figure 3:
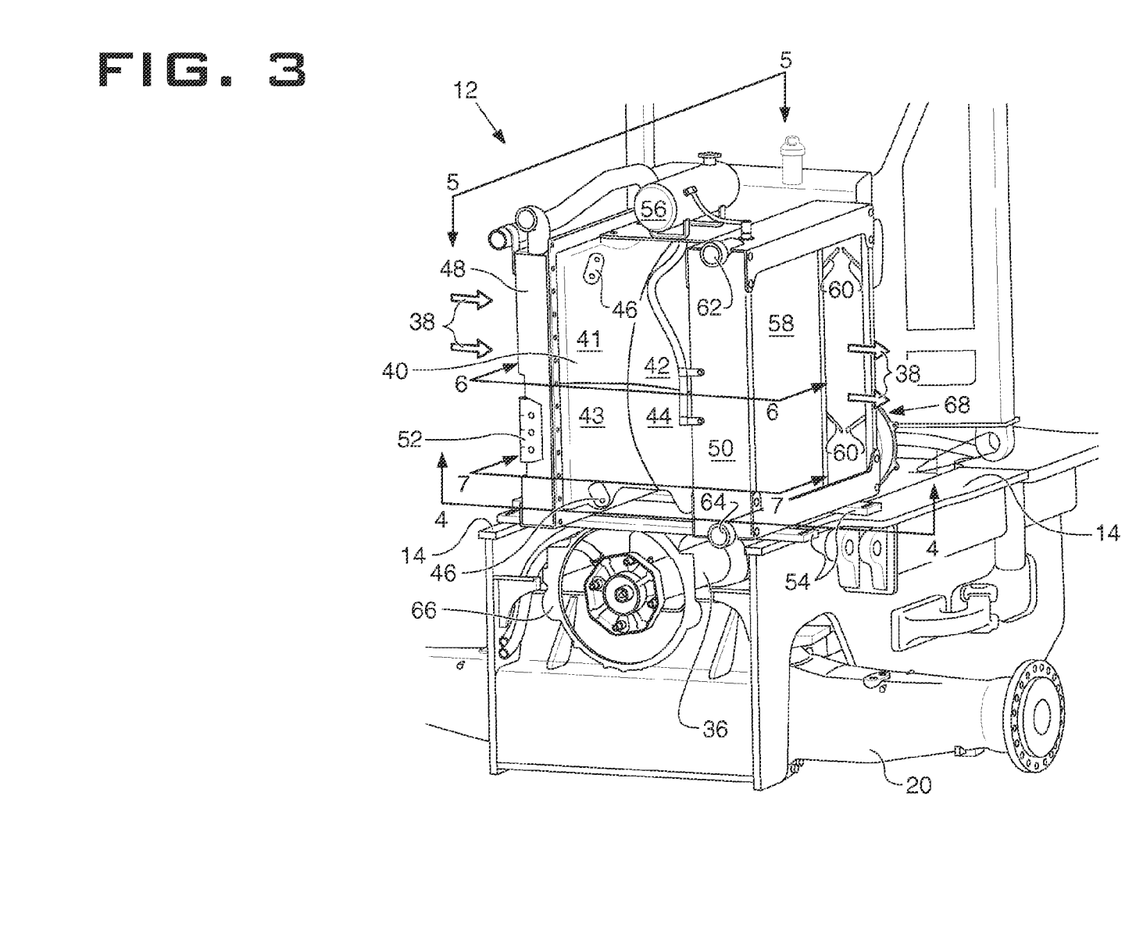
FIG. 3 illustrates a perspective view of an embodiment of an engine cooling system for the skidder of FIGS. 1 & 2.

FIG. 3 illustrates a perspective view of an embodiment of the engine cooling system 12 for the skidder machine 10. As can be seen, the cooling system 12 is attached to the frame 14 and is also nested over an engine drive shaft 36 such that and air flow (represented by arrows 38) through the cooling system 12 is generally perpendicular or normal to the drive shaft 36 and generally parallel to the axle 20. However, it should be understood that the air flow 38 may flow in directions other than that shown. In addition, the air flow 38 may be temporarily reversed at times to clean the engine cooling system 12 by blowing out particles that may have lodged into a side of the cooling system 12.

The cooling system 12 includes multiple heat exchangers (described in more detail below) spaced apart in a substantially parallel relationship having an air mover, such as a reversible hydraulic motor with a fan blade, (described in more detail below) enclosed within a venturi 40 between the multiple heat exchangers. The venturi 40 supports the air mover and provides a substantially closed air path for air moved by the air mover through each of the heat exchangers. In an embodiment, the venturi 40 is formed from molded fiberglass using multiple sections 41, 42, 43, 44, which are fastened together. Venturi sections 41 and 43 include air mover mounting pads 46 formed into the venturi section 41 and 43. Other materials and shapes are contemplated for the venturi 40.

Heat exchanger guards 48 and 50 generally encompass the heat exchangers radially to provide a mounting and support system for the heat exchangers and to protect the heat exchangers. The heat exchanger guards 48 and 50 fasten to the venturi 40 to support to the venturi 40 and the air mover. In an embodiment, a pivoting system (e.g., a hinge) 52 is attached to the heat exchanger guard 48. The pivoting system 52 is also attached to one or more heat exchangers. With this pivoting arrangement, the attached heat exchanger(s) are configured to pivot out, away from the air mover and the venturi 40, allowing access inside the venturi 40 for cleaning, maintenance, and/or other purposes. The heat exchanger guards 48 and 50 also fasten to mounting plates 54, which fasten to the frame 14.

The heat exchanger guards 48 and 50 also provide a mounting location for other devices, such as a surge tank system 56, which provides overflow cooling fluid capacity to an engine coolant radiator 58. The surge tank 56 may be located above the coolant level in the engine coolant radiator 58. The surge tank 56 may be nested into the natural curve of the venturi 40, which reduces an overall height of the cooling system 12. In an embodiment, the heat exchanger guards 48 and 50 may provide expansion slots to absorb natural expansion in the heat exchanger guards 48 and 50 as they increase in temperature during operation of the engine 16.

Heat exchangers of the present disclosure, such as the engine coolant radiator 58, are fin-tube heat exchangers allowing fluid to flow through tubes (not shown) of the heat exchanger while the fins (not shown) radiate heat from the fluid to the air passing through the heat exchanger. For example, heated engine cooling fluid flows from the engine 16 into the engine coolant radiator 58 at the inlet/heated fluid tube 62. Then, after being cooled, the cooled fluid flows from the outlet/cooled fluid tube 64 back to the engine 16. Other heat exchangers of the present disclosure discussed below may similarly radiate heat from a heated fluid to air passing through the respective heat exchanger. It is also contemplated that in alternative embodiments one or more of the heat exchangers of the present disclosure may be heat exchangers other than fin-tube type heat exchangers.

As can be seen in FIG. 3, the engine cooling system 12 is configured such that neighboring parts, such as the engine fly wheel bell housing (shown in partial) 66 can be located in a nested or mating fashion. In other words, the shape, size and locations of the venturi 40 and heat exchangers (e.g., 58) allow for the engine cooling system 12 to be located closer to and over a portion of the drive train such as the engine flywheel bell housing 66, the engine drive shaft 36, a transmission gear box 68, the axle 20 and/or other drive train components. As such, the engine compartment may be decreased in size, thereby providing better visibility for the operator. In another embodiment, the engine compartment is also able to provide good user visibility and still contain additional components such as a clean emission module.

Figure 4:
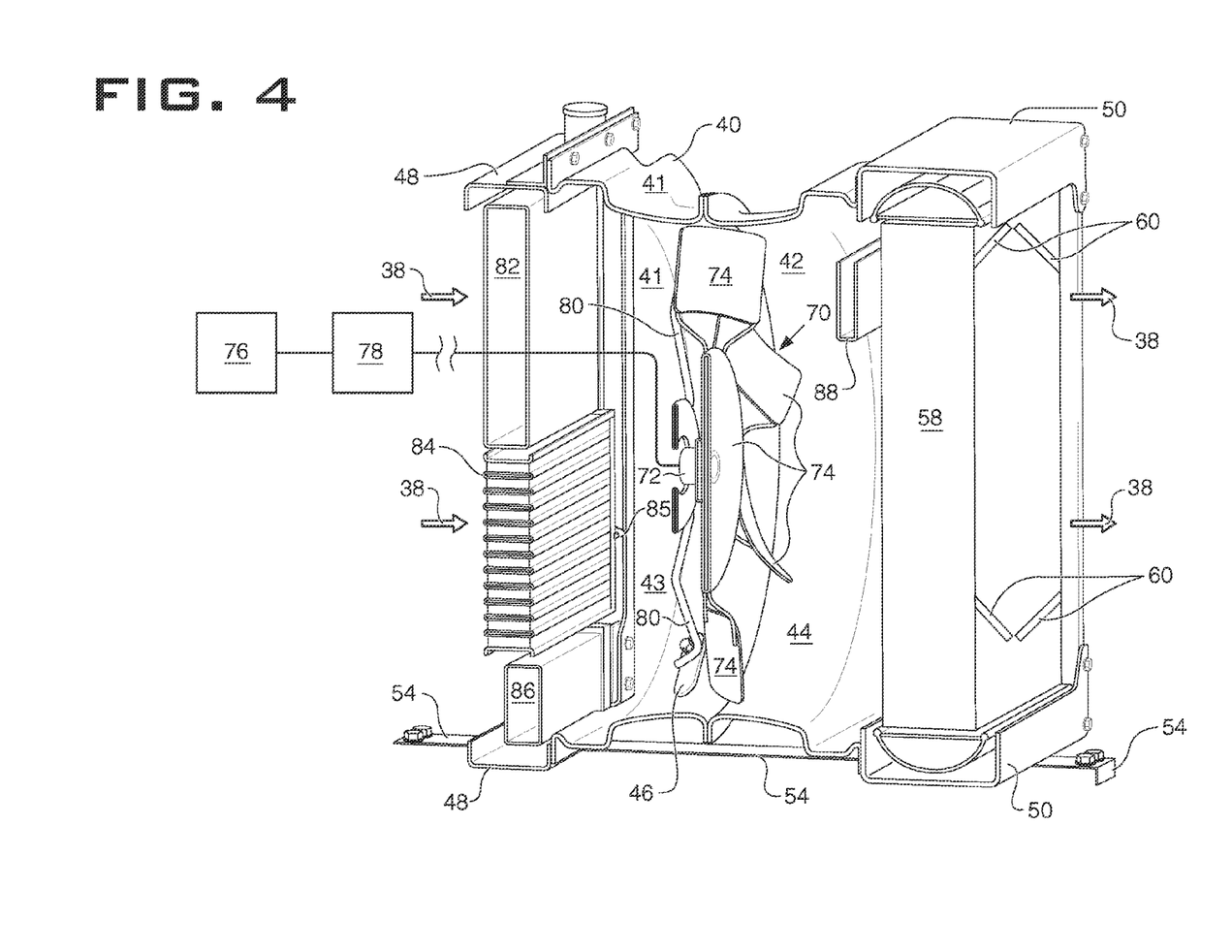
FIGS. 4-7 illustrate partial cutaway views of the engine cooling system of FIG. 3.

FIGS. 4-7 illustrate partial cutaway views of the engine cooling system 12. FIG. 4 shows a cutaway view of the engine cooling system 12 along the line 4-4 of FIG. 3. This view illustrates the sections 41, 42, 43, 44 of the venturi 40 enclosing air mover 70 assembly. The air mover 70 includes a motor 72 attached to a fan blade assembly 74. The motor 72 is a reversible hydraulic motor controlled to run at various speeds by a hydraulic fluid from the skidder machine 10's hydraulic system (not shown). An electronic controller device 76 varies a flow of the hydraulic fluid to the motor 72 using a varying flow hydraulic valve 78. The controller device 76 may use a look-up table stored on non-transitory computer readable medium to adjust the motor 72 to run at a desired speed to meet the cooling needs of all associated heat exchangers. The look-up table may include data such as motor revolutions per minute (RPM), air flow cubic feet per minute (CFM), ambient air temperature, humidity, cooling fluid temperature(s), engine operating conditions, and a variety of other data.

A stationary or stator portion of the motor 72 mounts to a mounting bracket 80 (e.g., a welded wire mounting bracket), which, in turn, mounts to the mounting pads 46 on the venturi 40. As a rotor portion of the motor 72 rotates, the fan blade assembly 74 also rotates. The rotation of the fan blade assembly 74 pulls air through the venturi 40. Having the venturi 40 sized to closely follow the path of the fan blade assembly 74, the air mover 70 can operate efficiently and reduce radial losses at the tips of the fan blades 74 which are common with traditional engine cooling packages.

In addition to the engine coolant radiator 58, the engine cooling system 12 may include various other heat exchangers, such as a charge air cooler 82, an air conditioner condenser 84, a hydraulic fluid cooler 86, and/or a fuel cooler 88. The charge air cooler 82 receives and cools compressed air from a turbo charger (not shown) causing the air to become denser than the previously heated compressed air. When the air is denser, it has more oxygen per unit of volume and, as such, facilitates better engine combustion. The air conditioner condenser 84 provides cooling to an air conditioner system (not shown) refrigerant to provide cooling to the operator station 24. The hydraulic fluid cooler 86 provides cooling to the skidder machine 10's hydraulic system fluid.

In an embodiment, the charge air cooler 82, the air conditioner condenser 84 and the hydraulic fluid cooler 86 are stacked adjacent one another (e.g., a stacked heat exchanger) causing the air flow 38 to pass substantially in parallel through these heat exchangers 82, 84, and 86. Conversely, in an embodiment, the fuel cooler 88 and the engine coolant radiator 58 are layered such that a portion of the air flow 38 that passes through the engine coolant radiator 58 also passes through the fuel cooler 88. It should be understood that the heat exchangers 58, 82, 84, 86, 88, and/or other heat exchangers may be arranged in a different formation.

In an embodiment, the air conditioner condenser 84 attaches to the pivoting system 52 and swings out and away from the air mover 70. A corresponding latch system 85 is provided to keep the air conditioner condenser 84 in a closed position during normal operation. To accommodate the pivoting of the air conditioner condenser 84, fluid (e.g., refrigerant) lines (not shown) providing fluid to and from the air conditioner condenser 84 are flexible fluid lines (e.g., hoses), which pivot or flex with the air conditioner condenser 84.

Generally, the heat exchangers 82, 84, and 86 on fresh air side of the engine cooling system 12 are considered low ΔT heat exchangers because they have a relatively low temperature differential that they are trying to achieve. Conversely, the heat exchangers 58 and 88 on the pre-heated air side of the engine cooling system 12 are considered high ΔT heat exchangers because they have a relatively high temperature differential that they are trying to achieve and are thus, more accepting of pre-heated air.

Figure 5:
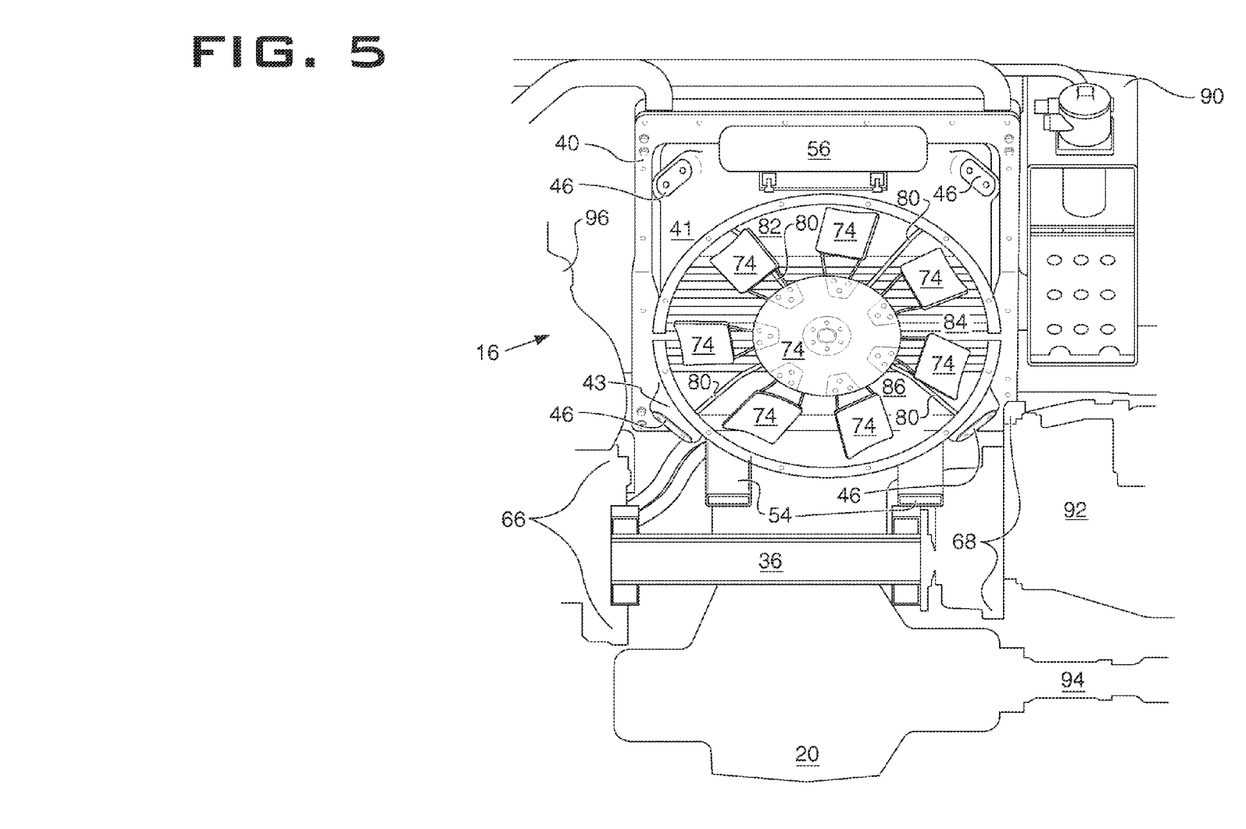
Figure 6:
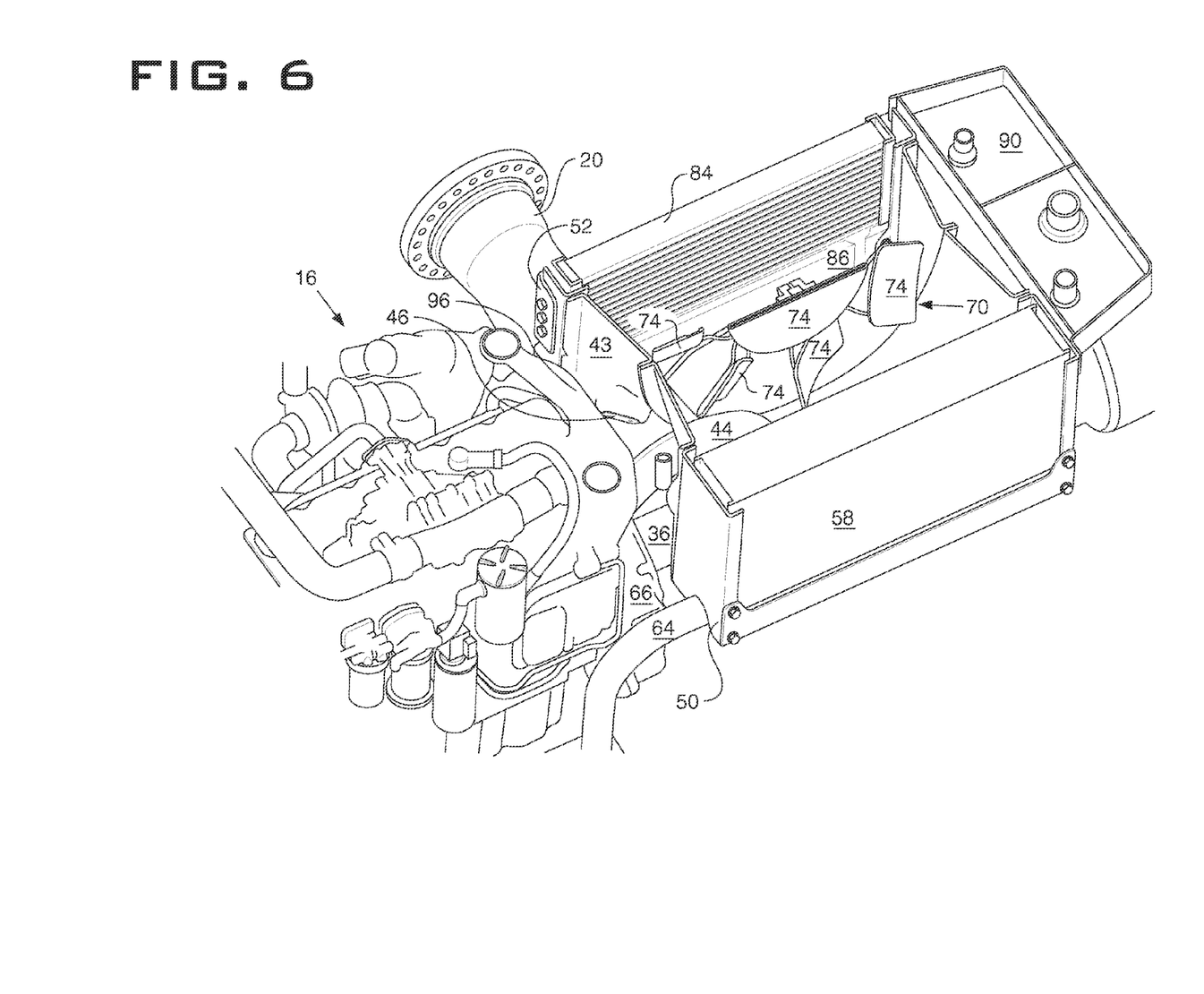
Figure 7:
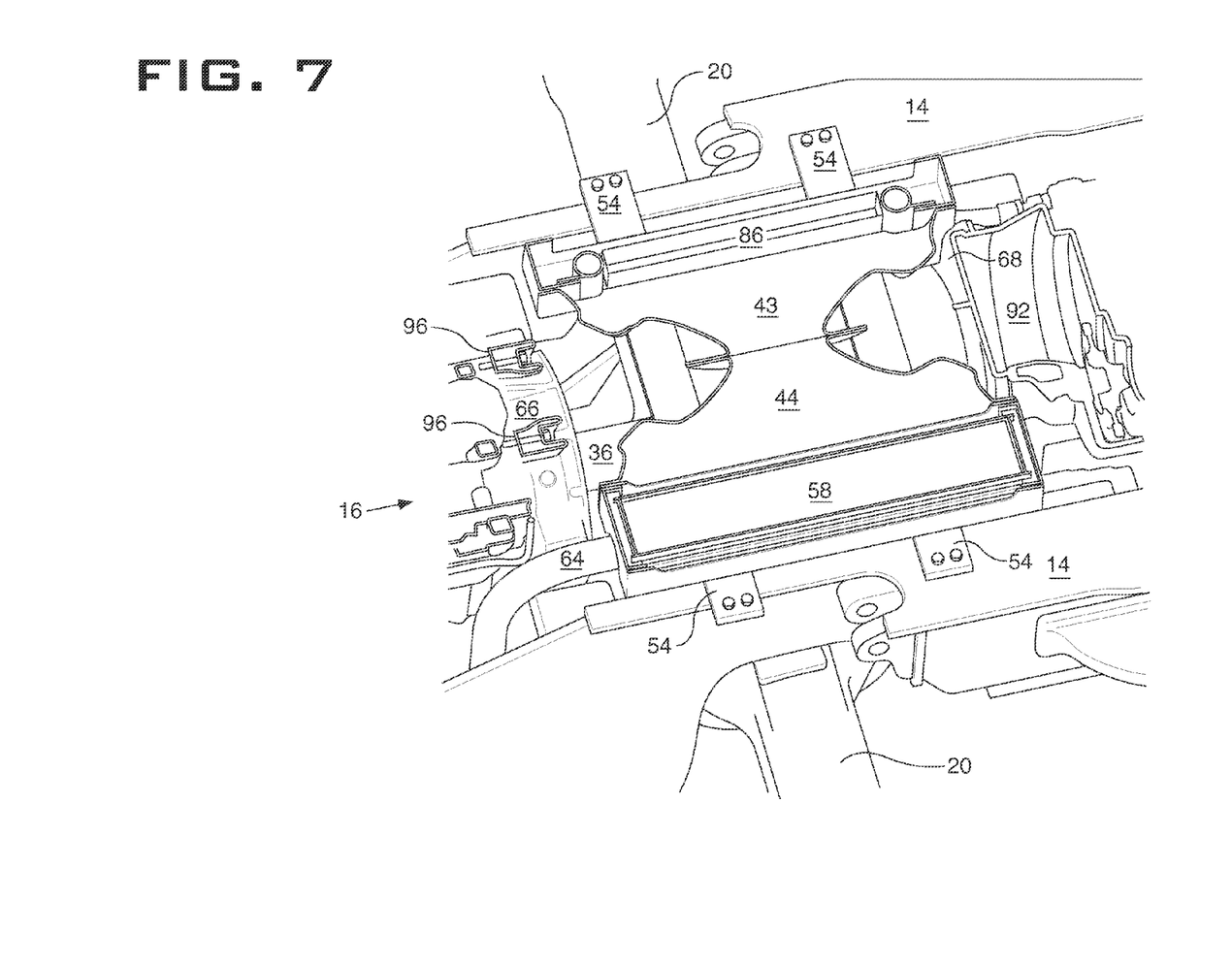

FIG. 5 shows a cutaway view of the engine cooling system 12 along the line 5-5 of FIG. 3. FIG. 6 shows a cutaway view of the engine cooling system 12 along the line 6-6 of FIG. 3. In addition to the components discussed above, FIGS. 5 and 6 show a hydraulic fluid tank 90, which is used as a reservoir to supply hydraulic fluid to and from the skidder machine 10's hydraulic system. FIGS. 5 and 6 also show the engine 16 and other drive train components nested adjacent the engine cooling system 12. A portion of a transmission system 92 that propels the skidder machine 10 using power from the engine 16 via the engine drive shaft 36 and in turn, provides power to the axle assembly 20 at a differential gear assembly via a transmission drive shaft 94. A clean emission module (CEM) mounting bracket 96 fastens to the engine 16 block and nests with the curvature of the venturi 40. The CEM (not shown) mounts on the CEM mounting bracket 96 above the engine 16. FIG. 7 shows a cutaway section of the engine cooling system 12 at a lower portion of the cooling system 12 along line 7-7 of FIG. 3.

Industrial Applicability

The present disclosure relates generally to an engine cooling system. In a specific embodiment, the present disclosure relates to a skidder machine 10 having an engine cooling system 12 with an enclosed fan air mover 70. The air mover 70 pulls fresh air through the heat exchangers 82, 84 and 86 and then pushes that air (now pre-heated air) through heat exchangers 58 and 88. With the air mover 70 enclosed within the venturi 40, there is no need for an additional screen around the air mover 70.

As can be seen in the figures, the engine cooling system 12 is configured such that neighboring parts, such as the engine fly wheel bell housing 66 can be located in a nested or mating fashion. In other words, the shape, size and locations of the venturi 40 and heat exchangers 58, 82, 84, 86, and 88 allow for the engine cooling system 12 to be located closer to and over a portion of the drive train such as the engine flywheel bell housing 66, the engine drive shaft 36, the transmission gear box 68, the axle 20 and/or other drive train components. As such, the engine compartment may be decreased in size, thereby providing better visibility for the operator. In another embodiment, the engine compartment is also able to provide good user visibility and still enclose a clean emission module.

The heat exchangers 82, 84, and 86 on fresh air side of the engine cooling system 12 are considered low ΔT heat exchangers because they have a relatively low temperature differential that they are trying to achieve. Conversely, the heat exchangers 58 and 88 on the pre-heated air side of the engine cooling system 12 are considered high ΔT heat exchangers because they have a relatively high temperature differential that they are trying to achieve and are thus, more accepting of pre-heated air.

The rotation of the fan blade assembly 74 pulls air through the venturi 40. Having the venturi 40 sized to closely follow the path of the fan blade assembly 74, the air mover 70 can operate efficiently and reduce radial losses at the tips of the fan blades 74 which are common with traditional engine cooling packages.

In an embodiment, the charge air cooler 82, the air conditioner condenser 84 and the hydraulic fluid cooler 86 are stacked adjacent one another causing the air flow 38 to pass substantially in parallel through one of these heat exchangers 82, 84, and 86. Conversely, in an embodiment, the fuel cooler 88 and the engine coolant radiator 58 are layered such that a portion of the air flow 38 that passes through the engine coolant radiator 58 also passes through the fuel cooler 88.

It should be understood that the above description is intended for illustrative purposes only. In particular, it should be appreciated that all methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. Such embodiments should be understood to fall within the scope of the present invention as determined based upon the claims below and any equivalents thereof.

What is claimed is:

1. An engine cooling system comprising:
   a first heat exchanger receiving a first fluid;
   a second heat exchanger receiving a second fluid and located adjacent the first heat exchanger, creating, a stacked heat exchanger;
   a third heat exchanger receiving a third fluid and located apart from the stacked heat exchanger;
   a venturi located between the stacked heat exchanger and the third heat exchanger; and
   an air mover mounted to the venturi and located within the venturi, the air mover is configured to move air through the stacked heat exchanger and through the third heat exchanger.

2. The engine cooling system of claim 1, wherein the stacked heat exchanger further includes a fourth heat exchanger adjacent the second heat exchanger and opposite the first heat exchanger.

3. The engine cooling system of claim 2, wherein the first, second and fourth heat exchangers are one of a charge air cooler, an air conditioner condenser and a hydraulic :fluid cooler.

4. The engine cooling system of claim 1, further including a fifth heat exchanger layered with the third heat exchanger such that a portion air that passes through the third heat exchanger also passes through the fifth heat exchanger.

5. The engine cooling system of claim 4, wherein the third heat exchanger is an engine coolant radiator and the fifth heat exchanger is a fuel cooler.

6. The engine cooling system of claim 1, wherein the venturi is formed using multiple sections connected together to form an air passage from the stacked heat exchanger to the third heat exchanger.

7. The engine cooling system of claim 1, wherein the air mover is a hydraulically driven reversible fan.

8. A vehicle comprising
   a frame;
   an engine supported by the frame;
   a drive train configured to propel the machine using power from the engine; and
   an engine cooling system in fluid communication with the engine, the engine cooling system includes;
   a low ΔT heat exchanger;
   a high ΔT heat exchanger located apart the low ΔT heat exchanger;
   a venture located between the low ΔT heat exchanger and the high ΔT heat exchanger, the venturi is nested with a drive shaft portion of drive train; and
   an air mover located within the venturi, the air mover is configured to move air through the low ΔT heat exchanger and then through the high ΔT heat exchanger at a direction substantially normal to the drive shaft.

9. The vehicle of claim 8, wherein the low ΔT heat exchanger includes one or more of a charge air cooler, an air conditioner condenser, and a hydraulic fluid cooler.

10. The vehicle of claim 9, wherein the high ΔT heat exchanger includes one or more of an engine radiator and a fuel cooler.

11. The vehicle of claim 10, further including a first heat exchanger guard around the low ΔT heat exchanger and a second heat exchanger guard around the high ΔT heat exchanger, the venturi is fastened to the first and second heat exchanger guards, thereby forming a closed air pathway between the heat exchangers.

12. The vehicle of claim 11, further including a bracket mounting the air mover to the venturi.

13. The vehicle of claim 8, wherein the air mover is a reversible fan configured to temporarily reverse direction to clean the heat exchangers.

14. The vehicle of claim 8, wherein one of the heat exchangers is mounted on hinges and pivots away from the air mover.

15. A skidder machine comprising;
    a frame;
    an engine supported by the frame;
    a drive train configured to propel the machine using power from the engine;
    a grapple system mounted to the frame, the grapple system is configured to clinch objects using power from the engine and to tow the objects as the machine is propelled; and
    an engine cooling system in fluid communication with the engine, the engine cooling system includes;
    a first heat exchanger receiving a first fluid;
    a second heat exchanger receiving a second fluid and located adjacent the first heat exchanger, creating a stacked heat exchanger;
    a third heat exchanger receiving a third fluid and located apart from the stacked heat exchanger;
    a venturi located between the stacked heat exchanger and the third heat exchanger; and
    an air mover mounted to the venturi and located within the venturi, the air mover is configured to move air through the stacked heat exchanger and through the third heat exchanger.

16. The skidder machine of claim 15, wherein the grapple system includes a plurality of hydraulically actuated arms pivotably mounted to a lift boom, the lift boom mounted to the frame.

17. The skidder machine of claim 15, further including a decking blade mounted to the frame opposite the grapple system.

18. The skidder machine of claim 15, wherein the frame is an articulated pivoting frame.

19. The skidder machine of claim 15, wherein the drive train includes an engine drive shall and an axle, and wherein the venturi is mounted on the frame over a portion of both the drive shaft and the axle.

20. The skidder machine of claim 19, wherein the air mover moves air substantially parallel to the axle and substantially normal to the drive shaft.

* * * * *

UNITED STATES PATENT AND TRADEMARK OFFICE
CERTIFICATE OF CORRECTION

PATENT NO. : 8,770,329 B2  
APPLICATION NO. : 13/184899  
DATED : July 8, 2014  
INVENTOR(S) : Jason Spitler Page 1 of 1

It is certified that error appears in the above-identified patent and that said Letters Patent is hereby corrected as shown below:

In the Specification

Column 5, line 53, delete "low AT" and insert -- low $\Delta T$ --.

Column 5, line 57, delete "high AT" and insert -- high $\Delta T$ --.

Column 6, line 13, delete "Industrial Applicability" and insert -- INDUSTRIAL APPLICABILITY --.

Column 6, line 37, delete "low AT" and insert -- low $\Delta T$ --.

In the Claims

Column 7, line 11, in Claim 1, delete "creating, a" and insert -- creating a --.

Column 7, line 27, in Claim 3, delete "hydraulic :fluid" and insert -- hydraulic fluid --.

Column 7, line 42, in Claim 8, delete "comprising" and insert -- comprising: --.

Column 7, line 50, in Claim 8, delete "apart the" and insert -- apart from the --.

Column 7, line 52, in Claim 8, delete "a venture" and insert -- a venturi --.

Column 8, line 20, in Claim 15, delete "comprising;" and insert -- comprising: --.

Column 8, line 53, in Claim 19, delete "drive shall" and insert -- drive shaft --.

Signed and Sealed this  
Fifteenth Day of September, 2015

Michelle K. Lee  
*Director of the United States Patent and Trademark Office*